(12) United States Patent
Shi et al.

(10) Patent No.: US 12,047,909 B2
(45) Date of Patent: Jul. 23, 2024

(54) METHODS AND APPARATUS FOR CONTROLLING A MODE OF OPERATION OF A WIRELESS DEVICE

(71) Applicant: Telefonaktiebolaget LM Ericsson (publ), Stockholm (SE)

(72) Inventors: Nianshan Shi, Järfälla (SE); Magnus Stattin, Upplands Väsby (SE); Paul Schliwa-Bertling, Ljungsbro (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 332 days.

(21) Appl. No.: 17/289,260

(22) PCT Filed: Sep. 26, 2019

(86) PCT No.: PCT/SE2019/050921
§ 371 (c)(1),
(2) Date: Apr. 28, 2021

(87) PCT Pub. No.: WO2020/091641
PCT Pub. Date: May 7, 2020

(65) Prior Publication Data
US 2021/0400630 A1 Dec. 23, 2021

Related U.S. Application Data

(60) Provisional application No. 62/754,187, filed on Nov. 1, 2018.

(51) Int. Cl.
*H04W 68/02* (2009.01)
*H04W 8/20* (2009.01)
*H04W 92/14* (2009.01)

(52) U.S. Cl.
CPC .......... *H04W 68/02* (2013.01); *H04W 8/205* (2013.01); *H04W 92/14* (2013.01)

(58) Field of Classification Search
CPC ....... H04W 68/02; H04W 92/14; H04W 8/20; H04W 8/08; H04W 8/245; H04W 76/25;
(Continued)

(56) References Cited

U.S. PATENT DOCUMENTS 9,155,121 B2 * 10/2015 Rayavarapu .......... H04W 76/19
9,247,575 B2 * 1/2016 Rayavarapu .......... H04W 76/19
(Continued)

FOREIGN PATENT DOCUMENTS

CN       102948233 A     2/2013
WO      2018065060 A1    4/2018
(Continued)

OTHER PUBLICATIONS

3GPP, "3GPP TS 23.401 V16.0.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Sep. 2018, 1-410.
(Continued)

*Primary Examiner* — Man U Phan
(74) *Attorney, Agent, or Firm* — Murphy, Bilak & Homiller, PLLC

(57) ABSTRACT

Embodiments described herein relate to methods and apparatuses for controlling a mode of operation of a wireless device. A method in a base station comprises receiving, from a core network node, a first indication of a level of pending signalling or user plane data to be transmitted to the wireless device; and based on the first indication, controlling the mode of operation of the wireless device.

10 Claims, 12 Drawing Sheets

(58) Field of Classification Search
CPC ... H04W 56/00; H04W 72/04; H04W 92/045; H04W 76/00; H04W 24/08; H04W 8/24; H04W 76/38; H04W 48/16; H04W 76/27; H04W 88/08; H04W 36/00; H04W 48/08; H04W 4/70; H04L 5/00
USPC .......................................................... 370/329
See application file for complete search history.

(56) References Cited

U.S. PATENT DOCUMENTS

| | | | |
|---|---|---|---|
| 9,258,839 B2* | 2/2016 | Rayavarapu | H04W 76/19 |
| 9,295,095 B2* | 3/2016 | Rayavarapu | H04W 76/27 |
| 9,414,338 B2* | 8/2016 | Cai | H04W 56/00 |
| 10,015,785 B2* | 7/2018 | Anderson | H04W 72/23 |
| 10,292,131 B2* | 5/2019 | Schliwa-Bertling | H04W 68/02 |
| 10,932,121 B2* | 2/2021 | Kim | H04W 52/0229 |
| 10,986,689 B2* | 4/2021 | Rayavarapu | H04W 76/27 |
| 11,343,791 B2* | 5/2022 | Wong | H04W 76/27 |
| 11,350,482 B2* | 5/2022 | Kim | H04W 76/25 |
| 11,418,998 B2* | 8/2022 | Zee | H04W 48/12 |
| 11,457,347 B2* | 9/2022 | Gupta | H04W 76/12 |
| 11,516,771 B2* | 11/2022 | Nord | H04W 68/00 |
| 11,653,328 B2* | 5/2023 | Chang | H04W 12/03 370/329 |
| 2017/0265133 A1* | 9/2017 | Chandramouli | H04W 52/0216 |
| 2021/0176621 A1* | 6/2021 | Kim | H04W 28/02 |
| 2022/0201744 A1* | 6/2022 | Shrestha | H04W 76/27 |

FOREIGN PATENT DOCUMENTS

| | | |
|---|---|---|
| WO | 2018128505 A1 | 7/2018 |
| WO | 2018132100 A1 | 7/2018 |

OTHER PUBLICATIONS

3GPP, "3GPP TS 36.300 V15.3.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2018, 1-358.

3GPP, "3GPP TS 36.321 V15.3.0", 3rd Generation Partnership Project; Technical Specification Group Radio Access Network; Evolved Universal Terrestrial Radio Access (E-UTRA); Medium Access Control (MAC) protocol specification (Release 15), Sep. 2018, 1-127.

3GPP, "3GPP TS 36.331 V15.3.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2018, 1-918.

3GPP, "3GPP TS 36.413 V15.3.0", 3rd Generation Partnership Project; Technical Specification Group Radio Access Network; Evolved Universal Terrestrial Radio Access Network (E-UTRAN); S1 Application Protocol (S1AP) (Release 15), Sep. 2018, 1-383.

3GPP, "3rd Generation Partnership Project; Technical Specification Group Services and System Aspects; 3GPP System Architecture Evolution (SAE); Security architecture (Release 15)", 3GPP TS 33.401 V15.1.0, Sep. 2017, 1-161.

* cited by examiner

1302
Transmit, from a core network node, a first indication of a level of pending signalling or user plane data to be transmitted to the wireless device

Fig. 13

1400
Virtual Apparatus

1402
Transmitting Unit

Fig. 14

METHODS AND APPARATUS FOR CONTROLLING A MODE OF OPERATION OF A WIRELESS DEVICE

TECHNICAL FIELD

Embodiments described herein relate to methods and apparatuses for controlling a mode of operation of a wireless device.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Efficient user equipment (UE) (or wireless device) power operation may be essential for use cases in the Internet of Things (IoT) use case space, e.g. scenarios where the UE has little or no access to a power supply and a battery replacement may constitute high operational costs. To address these concerns, 3GPP introduced an Access Stratum Release Assistance Indication (AS RAI, see TS 36.300v15.3.0, TS 36.321v15.3.0 and TS 36.331v15.3.0) that assists the Radio Access Network (RAN) determining a mode of operation of the wireless device. For example, the RAN may utilize the AS RAI to determine whether the UE should be kept in a connected mode of operation, for example RRC_CONNECTED. Alternatively, if the UE uses 'Early Data Transmission" (see TS 36.300v15.3.0) this may also be understood as indication that, besides the data included in msg3, the UE has no further data to be transmitted. An Early Data Transmission may therefore be considered as an indication that there is no further expected transmission to or from the wireless device.

Using indications such as an AS RAI or an Early Data Transmission, the RAN may determine whether to move the UE into a UE power efficient mode of operation, for example RRC_IDLE, without waiting for an explicit connection release command (e.g. S1AP UE Context Release Command) from the core network, CN (for example from the Mobile Mobility Entity). This may enable UE power savings, and thus may prolong UE battery lifetime.

There currently exist certain challenge(s). For example, if signaling or user plane data is pending in the core network, such signaling or data may not be delivered to the wireless device if the wireless device is released from a connected mode of operation, for example due to an indication that the wireless device expects no further signaling or data transmission. In this example, to transmit the pending signaling or user plane data to the wireless device, the wireless device may need to be paged which causes extra signaling and may shorten wireless device battery life. In some cases, the wireless device may then become unreachable.

SUMMARY

Certain aspects of the present disclosure and their embodiments may provide solutions to these or other challenges. Embodiments described herein introduce transfer of information to the RAN (e.g. to a base station) regarding a level of pending signaling or user plane data to a wireless device. This transfer of information enables the RAN to determine when to use an AS RAI or Early Data Transfer or other criterion/signal/indication received from the wireless device as an indication that the wireless device has no more data to transfer. In other words, the RAN may determine when the wireless device may be released from a connected mode of operation (i.e. control plane (CP) CIoT Optimisation (see 3GPP TS 23.401v16.0.0) whilst ensuring the wireless device does not need to be paged in order to deliver pending signaling or user plane data to the wireless device from the core network, or that the wireless device is not made unreachable.

There are, proposed herein, various embodiments which address one or more of the issues disclosed herein.

Certain embodiments may provide one or more of the following technical advantage(s). Enabling efficient power usage when control plane (CP) CIoT Optimization (see 3GPP TS 23.401v16.0.0) is used whilst ensuring that a wireless device remains reachable for any mobile terminated (MT) pending user plane data or signaling in the CN.

BRIEF DESCRIPTION OF THE DRAWINGS

FIG. 13 illustrates a method in accordance with some embodiments;

FIG. 14 illustrates a virtualization apparatus in accordance with some embodiments.

DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Information about pending mobile terminated signaling or user plane data may be transmitted by a core network node to a base station. For example, an indication of a level of pending signaling or user plane data to be transmitted by the core network to a wireless device may be added to a UE Information Transfer procedure, for example as described in TS 36.413v15.3.0.

For example, the base station may receive, from a core network node (e.g. the Mobile Mobility Entity), a first indication of a level of pending signalling or user plane data to be transmitted to the wireless device; and based on the first indication, controls the mode of operation of the wireless device. The base station may also receive, from the wireless device, a second indication relating to a level of pending signalling or user plane data expected to be received or transmitted by the wireless device; and the base station may control the mode of operation of the wireless device further based on the second indication. For example, the second indication may comprise an AS RAI or an Early Data Transmission from the wireless device as described above.

Figure 1:
FIG. 1 illustrates an example of a signaling diagram for UE information transfer.

FIG. 1 illustrates an example of a signaling diagram for UE information transfer.

The core network node, which in this example comprises a Mobile Mobility Entity (MME), transfers the UE information transfer to a base station. The purpose of the UE information transfer procedure is for the MME to send UE information including Quality of Service (QoS) Parameters, and UE Radio capability, to the base station, for a Narrow-Band Internet of Things (NB-IoT) UE using Control Plane CIoT EPS Optimization.

The MME initiates the procedure by sending the UE information transfer message to the base station (e.g. eNB).

The UE information transfer message may comprise a UE Level QoS Parameters information element (IE). If the UE Level QoS Parameters IE is contained in the UE information transfer message, the base station may store this information in the UE context, and use it as specified in TS 23.401.

The UE information transfer may comprise a UE Radio Capability information element. If the UE Radio Capability IE is contained in the UE information transfer message, the base station may store this information in the UE context, and use it as specified in TS 23.401.

In embodiments described herein, the UE information transfer message may also comprise a Pending Data Indication IE. If the Pending Data Indication IE is contained in the UE INFORMATION TRANSFER message, the base station may store this information in the UE context. This Pending Data Indication IE may comprise an indication of a level of pending signaling and/or user plane data transfer to be transmitted by the core network to the wireless device.

It will be appreciated that the indication of a level of pending signaling and/or user plane data transfer to be transmitted by the core network to the wireless device may be transmitted separately or may be transmitted as part of any other suitable message.

In some embodiments the UE information transfer may comprise information as illustrated in Table 1. The UE information transfer message may the transmitted by the MME to transfer UE information over the S1 interface.

TABLE 1

Table 1 illustrates an example of the information comprised in a UE information transfer message according to some embodiments.

| IE/Group Name | Presence | Range | IE type and reference | Semantics description | Criticality | Assigned Criticality |
|---|---|---|---|---|---|---|
| Message Type | M | | 9.2.1.1 | | YES | reject |
| S-TMSI | M | | 9.2.3.6 | | YES | reject |
| UE Level QoS Parameters | O | | E-RAB Level QoS Parameters 9.2.1.15 | Includes QoS parameters. | YES | ignore |
| UE Radio Capability | O | | 9.2.1.27 | | YES | ignore |
| Subscription Based UE Differentiation Information | O | | 9.2.1.140 | | YES | ignore |
| Pending Data Indication | O | | | | YES | ignore |

In some embodiments, the RAN takes the information received in the UE information transfer into consideration when managing the connection with the UE, e.g. deciding when to release the RRC connection with the UE. One possibility is that based on the Pending Data Indication IE being set to 'true' (indicating that there is further signaling or user plane data to be transmitted to the wireless device), the RAN keeps the UE in or moves the UE into RRC_CONNECTED state, configures DRX to achieve a power efficient operation and keeps the UE in RRC_CONNECTED until downlink signaling or data transfer is completed.

In some examples, therefore responsive to the first indication indicating that there is pending signalling or user plane data to be transmitted to the wireless device from the core network (e.g. Pending Data Indication IE being set to 'true'), and the second indication indicating that there is no pending signalling or user plane data expected to be received or transmitted by the wireless device, a base station may set the mode of operation of the wireless device as a connected mode of operation. In other words, even if the base station receives an indication that the wireless device expects no further signalling or data (e.g. an AS RAI or a Early Data Transfer), if the base station also receives an indication from the core network that there is further signalling or user plane data to be transmitted to the wireless device, the base station may maintain the wireless device in a connected mode of operation.

In some embodiments the RAN may delay the state transition into a low power mode of operation, for example, RRC_IDLE or RRC_INACTIVE, based on machine learning or artificial intelligence ensuring that UE remains reachable for mobile terminated transfers. In other words, the base station may maintain the wireless device in the connected mode of operation until the pending signalling or user plane data has been transmitted to the wireless device. In some embodiments, responsive to the pending signalling or user plane data being transmitted to the wireless device, the base station may set the mode of operation of the wireless device to a lower power mode of operation.

In some examples, the base station, responsive to the first indication indicating that there is no pending signalling or user plane data to be transmitted to the wireless device (e.g. Pending Data Indication IE being set to 'false'), and the second indication indicating that there is no pending signalling or user plane data expected to be received or transmitted the wireless device, releases the wireless device from a connected mode of operation into a lower power of operation. In other words, responsive to both the first and second indications indicating that no further signalling or data is to be transmitted to the wireless device, the base station may release the wireless device from the connected mode of operation.

In embodiments described herein, therefore, the RAN ensures that the connected mode of operation is not always immediately released upon receiving a release assistance indication (i.e. a second indication as described above) or the like to enable occasional opportunities for delivering signaling or user plane data pending in the CN. In other words, despite reception of a second indication that the wireless device is not expecting any further transmission or signaling, the RAN occasionally keeps/establishes the connected mode of operation to provide opportunity for delivery of pending signaling or user plane data indicated by the first indication received from the core network node.

The embodiments described herein may therefore be used for delivery of mobile terminated (MT) signaling or user plan data in case of AS RAI or Early Data Transmission is used in combination with control plane (CP) Consumer Internet of Things (CIoT) Optimisation (see 3GPP TS 23.401v16.0.0) or user plane (UP) CIoT Optimisation (see 3GPP TS 23.401v16.0.0)

Figure 2:
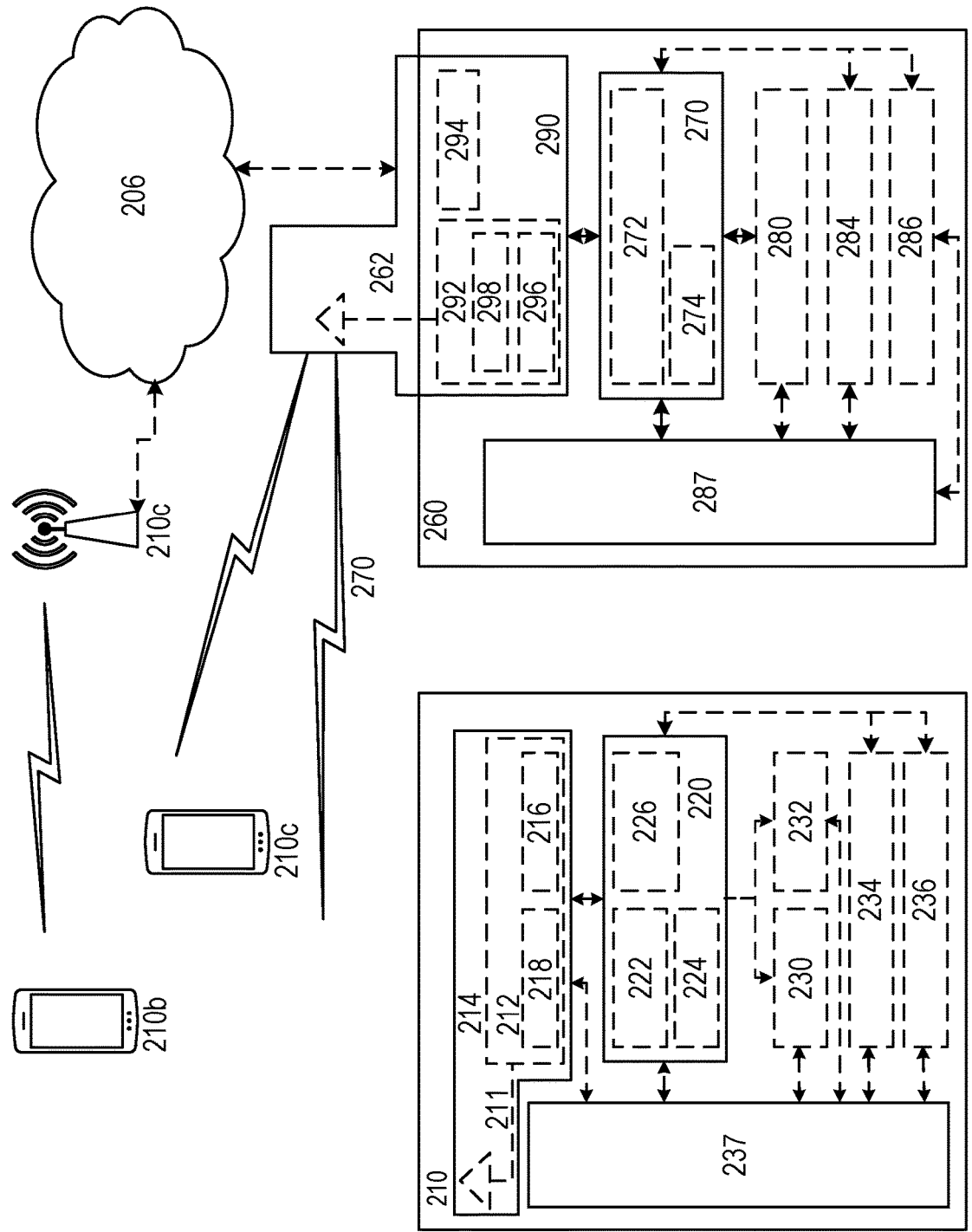
FIG. 2 illustrates a wireless network in accordance with some embodiments.

FIG. 2 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 2. For simplicity, the wireless network of FIG. 2 only depicts network 206, network nodes 260 and 260b, and WDs 210, 210b, and 210c. In practice, a wireless network may further include any additional elements suitable to support communication between wireless devices or between a wireless device and another communication device, such as a landline telephone, a service provider, or any other network node or end device.

Of the illustrated components, network node 260 and wireless device (WD) 210 are depicted with additional detail. The network node 260 may be a base station, as described above with reference to FIG. 1. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 260 and WD 210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 260 includes processing circuitry 270, device readable medium 280, interface 290, auxiliary equipment 284, power source 286, power circuitry 287, and antenna 262. Although network node 260 illustrated in the example wireless network of FIG. 2 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 260 are depicted as single boxes located within a larger box, or nested within multiple boxes, in practice, a network node may comprise multiple different physical components that make up a single illustrated component (e.g., device readable medium 280 may comprise multiple separate hard drives as well as multiple RAM modules).

Similarly, network node 260 may be composed of multiple physically separate components (e.g., a NodeB component and a RNC component, or a BTS component and a BSC component, etc.), which may each have their own respective components. In certain scenarios in which network node 260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 260 may be configured to support multiple radio access technologies (RATs). In such embodiments, some components may be duplicated (e.g., separate device readable medium 280 for the different RATs) and some components may be reused (e.g., the same antenna 262 may be shared by the RATs). Network node 260 may also include multiple sets of the various illustrated components for different wireless technologies integrated into network node 260, such as, for example, GSM, WCDMA, LTE, NR, WiFi, or Bluetooth wireless technologies. These wireless technologies may be integrated into the same or different chip or set of chips and other components within network node 260.

Processing circuitry 270 is configured to perform any determining, calculating, or similar operations (e.g., certain obtaining operations) described herein as being provided by a network node. These operations performed by processing circuitry 270 may include processing information obtained by processing circuitry 270 by, for example, converting the obtained information into other information, comparing the obtained information or converted information to information stored in the network node, and/or performing one or more operations based on the obtained information or converted information, and as a result of said processing making a determination.

Processing circuitry 270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 260 components, such as device readable medium 280, network node 260 functionality. For example, processing circuitry 270 may execute instructions stored in device readable medium 280 or in memory within processing circuitry 270. Such functionality may include providing any of the various wireless features, functions, or benefits discussed herein. In some embodiments, processing circuitry 270 may include a system on a chip (SOC).

In some embodiments, processing circuitry 270 may include one or more of radio frequency (RF) transceiver circuitry 272 and baseband processing circuitry 274. In some embodiments, radio frequency (RF) transceiver circuitry 272 and baseband processing circuitry 274 may be on separate chips (or sets of chips), boards, or units, such as radio units and digital units. In alternative embodiments, part or all of RF transceiver circuitry 272 and baseband processing circuitry 274 may be on the same chip or set of chips, boards, or units In certain embodiments, some or all of the functionality described herein as being provided by a network node, base station, eNB or other such network device may be performed by processing circuitry 270 executing instructions stored on device readable medium 280 or memory within processing circuitry 270. In alternative embodiments, some or all of the functionality may be provided by processing circuitry 270 without executing instructions stored on a separate or discrete device readable medium, such as in a hard-wired manner. In any of those embodiments, whether executing instructions stored on a device readable storage medium or not, processing circuitry 270 can be configured to perform the described functionality. The benefits provided by such functionality are not limited to processing circuitry 270 alone or to other components of network node 260, but are enjoyed by network node 260 as a whole, and/or by end users and the wireless network generally.

Device readable medium 280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 270. Device readable medium 280 may store any suitable instructions, data or information, including a computer program, software, an application including one or more of logic, rules, code, tables, etc. and/or other instructions capable of being executed by processing circuitry 270 and, utilized by network node 260. Device readable medium 280 may be used to store any calculations made by processing circuitry 270 and/or any data received via interface 290. In some embodiments, processing circuitry 270 and device readable medium 280 may be considered to be integrated.

Interface 290 is used in the wired or wireless communication of signalling and/or data between network node 260, network 206, and/or WDs 210. As illustrated, interface 290 comprises port(s)/terminal(s) 294 to send and receive data, for example to and from network 206 over a wired connection. Interface 290 also includes radio front end circuitry 292 that may be coupled to, or in certain embodiments a part of, antenna 262. Radio front end circuitry 292 comprises filters 298 and amplifiers 296. Radio front end circuitry 292 may be connected to antenna 262 and processing circuitry 270. Radio front end circuitry may be configured to condition signals communicated between antenna 262 and processing circuitry 270. Radio front end circuitry 292 may receive digital data that is to be sent out to other network nodes or WDs via a wireless connection. Radio front end circuitry 292 may convert the digital data into a radio signal having the appropriate channel and bandwidth parameters using a combination of filters 298 and/or amplifiers 296. The radio signal may then be transmitted via antenna 262. Similarly, when receiving data, antenna 262 may collect radio signals which are then converted into digital data by radio front end circuitry 292. The digital data may be passed to processing circuitry 270. In other embodiments, the interface may comprise different components and/or different combinations of components.

In certain alternative embodiments, network node 260 may not include separate radio front end circuitry 292, instead, processing circuitry 270 may comprise radio front end circuitry and may be connected to antenna 262 without separate radio front end circuitry 292. Similarly, in some embodiments, all or some of RF transceiver circuitry 272 may be considered a part of interface 290. In still other embodiments, interface 290 may include one or more ports or terminals 294, radio front end circuitry 292, and RF transceiver circuitry 272, as part of a radio unit (not shown), and interface 290 may communicate with baseband processing circuitry 274, which is part of a digital unit (not shown).

Antenna 262 may include one or more antennas, or antenna arrays, configured to send and/or receive wireless signals. Antenna 262 may be coupled to radio front end circuitry 290 and may be any type of antenna capable of transmitting and receiving data and/or signals wirelessly. In some embodiments, antenna 262 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 262 may be separate from network node 260 and may be connectable to network node 260 through an interface or port.

Antenna 262, interface 290, and/or processing circuitry 270 may be configured to perform any receiving operations and/or certain obtaining operations described herein as being performed by a network node. Any information, data and/or signals may be received from a wireless device, another network node and/or any other network equipment. Similarly, antenna 262, interface 290, and/or processing circuitry 270 may be configured to perform any transmitting operations described herein as being performed by a network node. Any information, data and/or signals may be transmitted to a wireless device, another network node and/or any other network equipment.

Power circuitry 287 may comprise, or be coupled to, power management circuitry and is configured to supply the components of network node 260 with power for performing the functionality described herein. Power circuitry 287 may receive power from power source 286. Power source 286 and/or power circuitry 287 may be configured to provide power to the various components of network node 260 in a form suitable for the respective components (e.g., at a voltage and current level needed for each respective component). Power source 286 may either be included in, or external to, power circuitry 287 and/or network node 260. For example, network node 260 may be connectable to an external power source (e.g., an electricity outlet) via an input circuitry or interface such as an electrical cable, whereby the external power source supplies power to power circuitry 287. As a further example, power source 286 may comprise a source of power in the form of a battery or battery pack which is connected to, or integrated in, power circuitry 287. The battery may provide backup power should the external power source fail. Other types of power sources, such as photovoltaic devices, may also be used.

Alternative embodiments of network node 260 may include additional components beyond those shown in FIG. 2 that may be responsible for providing certain aspects of the network node's functionality, including any of the functionality described herein and/or any functionality necessary to support the subject matter described herein. For example, network node 260 may include user interface equipment to allow input of information into network node 260 and to allow output of information from network node 260. This may allow a user to perform diagnostic, maintenance, repair, and other administrative functions for network node 260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 210 includes antenna 211, interface 214, processing circuitry 220, device readable medium 230, user interface equipment 232, auxiliary equipment 234, power source 236 and power circuitry 237. WD 210 may include multiple sets of one or more of the illustrated components for different wireless technologies supported by WD 210, such as, for example, GSM, WCDMA, LTE, NR, WiFi, WiMAX, or Bluetooth wireless technologies, just to mention a few. These wireless technologies may be integrated into the same or different chips or set of chips as other components within WD 210.

Antenna 211 may include one or more antennas or antenna arrays, configured to send and/or receive wireless signals, and is connected to interface 214. In certain alternative embodiments, antenna 211 may be separate from WD 210 and be connectable to WD 210 through an interface or port. Antenna 211, interface 214, and/or processing circuitry 220 may be configured to perform any receiving or transmitting operations described herein as being performed by a WD. Any information, data and/or signals may be received from a network node and/or another WD. In some embodiments, radio front end circuitry and/or antenna 211 may be considered an interface.

As illustrated, interface 214 comprises radio front end circuitry 212 and antenna 211. Radio front end circuitry 212 comprise one or more filters 218 and amplifiers 216. Radio front end circuitry 214 is connected to antenna 211 and processing circuitry 220, and is configured to condition signals communicated between antenna 211 and processing circuitry 220. Radio front end circuitry 212 may be coupled to or a part of antenna 211. In some embodiments, WD 210 may not include separate radio front end circuitry 212; rather, processing circuitry 220 may comprise radio front end circuitry and may be connected to antenna 211. Similarly, in some embodiments, some or all of RF transceiver circuitry 222 may be considered a part of interface 214. Radio front end circuitry 212 may receive digital data that is to be sent out to other network nodes or WDs via a wireless connection. Radio front end circuitry 212 may convert the digital data into a radio signal having the appropriate channel and bandwidth parameters using a combination of filters 218 and/or amplifiers 216. The radio signal may then be transmitted via antenna 211. Similarly, when receiving data, antenna 211 may collect radio signals which are then converted into digital data by radio front end circuitry 212. The digital data may be passed to processing circuitry 220. In other embodiments, the interface may comprise different components and/or different combinations of components.

Processing circuitry 220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 210 components, such as device readable medium 230, WD 210 functionality. Such functionality may include providing any of the various wireless features or benefits discussed herein. For example, processing circuitry 220 may execute instructions stored in device readable medium 230 or in memory within processing circuitry 220 to provide the functionality disclosed herein.

As illustrated, processing circuitry 220 includes one or more of RF transceiver circuitry 222, baseband processing circuitry 224, and application processing circuitry 226. In other embodiments, the processing circuitry may comprise different components and/or different combinations of components. In certain embodiments processing circuitry 220 of WD 210 may comprise a SOC. In some embodiments, RF transceiver circuitry 222, baseband processing circuitry 224, and application processing circuitry 226 may be on separate chips or sets of chips. In alternative embodiments, part or all of baseband processing circuitry 224 and application processing circuitry 226 may be combined into one chip or set of chips, and RF transceiver circuitry 222 may be on a separate chip or set of chips. In still alternative embodiments, part or all of RF transceiver circuitry 222 and baseband processing circuitry 224 may be on the same chip or set of chips, and application processing circuitry 226 may be on a separate chip or set of chips. In yet other alternative embodiments, part or all of RF transceiver circuitry 222, baseband processing circuitry 224, and application processing circuitry 226 may be combined in the same chip or set of chips. In some embodiments, RF transceiver circuitry 222 may be a part of interface 214. RF transceiver circuitry 222 may condition RF signals for processing circuitry 220.

In certain embodiments, some or all of the functionality described herein as being performed by a WD may be provided by processing circuitry 220 executing instructions stored on device readable medium 230, which in certain embodiments may be a computer-readable storage medium. In alternative embodiments, some or all of the functionality may be provided by processing circuitry 220 without executing instructions stored on a separate or discrete device readable storage medium, such as in a hard-wired manner. In any of those particular embodiments, whether executing instructions stored on a device readable storage medium or not, processing circuitry 220 can be configured to perform the described functionality. The benefits provided by such functionality are not limited to processing circuitry 220 alone or to other components of WD 210, but are enjoyed by WD 210 as a whole, and/or by end users and the wireless network generally.

Processing circuitry 220 may be configured to perform any determining, calculating, or similar operations (e.g., certain obtaining operations) described herein as being performed by a WD. These operations, as performed by processing circuitry 220, may include processing information obtained by processing circuitry 220 by, for example, converting the obtained information into other information, comparing the obtained information or converted information to information stored by WD 210, and/or performing one or more operations based on the obtained information or converted information, and as a result of said processing making a determination.

Device readable medium 230 may be operable to store a computer program, software, an application including one or more of logic, rules, code, tables, etc. and/or other instructions capable of being executed by processing circuitry 220. Device readable medium 230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 220. In some embodiments, processing circuitry 220 and device readable medium 230 may be considered to be integrated.

User interface equipment 232 may provide components that allow for a human user to interact with WD 210. Such interaction may be of many forms, such as visual, audial, tactile, etc. User interface equipment 232 may be operable to produce output to the user and to allow the user to provide input to WD 210. The type of interaction may vary depending on the type of user interface equipment 232 installed in WD 210. For example, if WD 210 is a smart phone, the interaction may be via a touch screen; if WD 210 is a smart meter, the interaction may be through a screen that provides usage (e.g., the number of gallons used) or a speaker that provides an audible alert (e.g., if smoke is detected). User interface equipment 232 may include input interfaces, devices and circuits, and output interfaces, devices and circuits. User interface equipment 232 is configured to allow input of information into WD 210, and is connected to processing circuitry 220 to allow processing circuitry 220 to process the input information. User interface equipment 232 may include, for example, a microphone, a proximity or other sensor, keys/buttons, a touch display, one or more cameras, a USB port, or other input circuitry. User interface equipment 232 is also configured to allow output of information from WD 210, and to allow processing circuitry 220 to output information from WD 210. User interface equipment 232 may include, for example, a speaker, a display, vibrating circuitry, a USB port, a headphone interface, or other output circuitry. Using one or more input and output interfaces, devices, and circuits, of user interface equipment 232, WD 210 may communicate with end users and/or the wireless network, and allow them to benefit from the functionality described herein.

Auxiliary equipment 234 is operable to provide more specific functionality which may not be generally performed by WDs. This may comprise specialized sensors for doing measurements for various purposes, interfaces for additional types of communication such as wired communications etc. The inclusion and type of components of auxiliary equipment 234 may vary depending on the embodiment and/or scenario.

Power source 236 may, in some embodiments, be in the form of a battery or battery pack. Other types of power sources, such as an external power source (e.g., an electricity outlet), photovoltaic devices or power cells, may also be used. WD 210 may further comprise power circuitry 237 for delivering power from power source 236 to the various parts of WD 210 which need power from power source 236 to carry out any functionality described or indicated herein. Power circuitry 237 may in certain embodiments comprise power management circuitry. Power circuitry 237 may additionally or alternatively be operable to receive power from an external power source; in which case WD 210 may be connectable to the external power source (such as an electricity outlet) via input circuitry or an interface such as an electrical power cable. Power circuitry 237 may also in certain embodiments be operable to deliver power from an external power source to power source 236. This may be, for example, for the charging of power source 236. Power circuitry 237 may perform any formatting, converting, or other modification to the power from power source 236 to make the power suitable for the respective components of WD 210 to which power is supplied.

Figure 3:
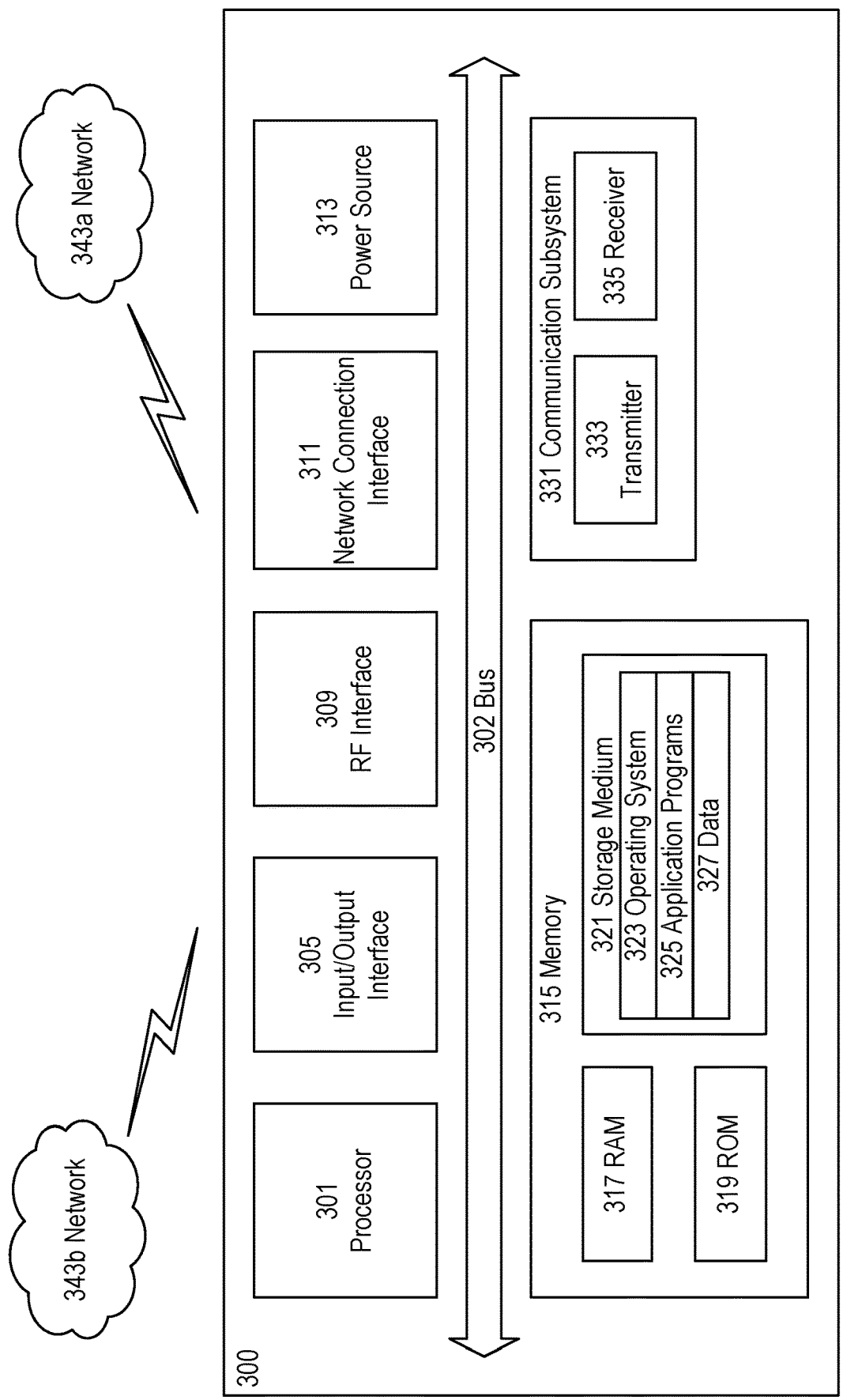
FIG. 3 illustrates a User Equipment in accordance with some embodiments.

FIG. 3 illustrates a User Equipment in accordance with some embodiments.

FIG. 3 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 3200 may be any UE identified by the $3^{rd}$ Generation Partnership Project (3GPP), including a NB-IoT UE, a machine type communication (MTC) UE, and/or an enhanced MTC (eMTC) UE. UE 300, as illustrated in FIG. 3, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 3 is a UE, the components discussed herein are equally applicable to a WD, and vice-versa.

In FIG. 3, UE 300 includes processing circuitry 301 that is operatively coupled to input/output interface 305, radio frequency (RF) interface 309, network connection interface 311, memory 315 including random access memory (RAM) 317, read-only memory (ROM) 319, and storage medium 321 or the like, communication subsystem 331, power source 333, and/or any other component, or any combination thereof. Storage medium 321 includes operating system 323, application program 325, and data 327. In other embodiments, storage medium 321 may include other similar types of information. Certain UEs may utilize all of the components shown in FIG. 3, or only a subset of the components. The level of integration between the components may vary from one UE to another UE. Further, certain UEs may contain multiple instances of a component, such as multiple processors, memories, transceivers, transmitters, receivers, etc.

In FIG. 3, processing circuitry 301 may be configured to process computer instructions and data. Processing circuitry 301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 301 may include two central processing units (CPUs). Data may be information in a form suitable for use by a computer.

In the depicted embodiment, input/output interface 305 may be configured to provide a communication interface to an input device, output device, or input and output device. UE 300 may be configured to use an output device via input/output interface 305. An output device may use the same type of interface port as an input device. For example, a USB port may be used to provide input to and output from UE 300. The output device may be a speaker, a sound card, a video card, a display, a monitor, a printer, an actuator, an emitter, a smartcard, another output device, or any combination thereof. UE 300 may be configured to use an input device via input/output interface 305 to allow a user to capture information into UE 300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 3, RF interface 309 may be configured to provide a communication interface to RF components such as a transmitter, a receiver, and an antenna. Network connection interface 311 may be configured to provide a communication interface to network 343a. Network 343a may encompass wired and/or wireless networks such as a local-area network (LAN), a wide-area network (WAN), a computer network, a wireless network, a telecommunications network, another like network or any combination thereof. For example, network 343a may comprise a Wi-Fi network. Network connection interface 311 may be configured to include a receiver and a transmitter interface used to communicate with one or more other devices over a communication network according to one or more communication protocols, such as Ethernet, TCP/IP, SONET, ATM, or the like. Network connection interface 311 may implement receiver and transmitter functionality appropriate to the communication network links (e.g., optical, electrical, and the like). The transmitter and receiver functions may share circuit components, software or firmware, or alternatively may be implemented separately.

RAM 317 may be configured to interface via bus 302 to processing circuitry 301 to provide storage or caching of data or computer instructions during the execution of software programs such as the operating system, application programs, and device drivers. ROM 319 may be configured to provide computer instructions or data to processing circuitry 301. For example, ROM 319 may be configured to store invariant low-level system code or data for basic system functions such as basic input and output (I/O), startup, or reception of keystrokes from a keyboard that are stored in a non-volatile memory. Storage medium 321 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 321 may be configured to include operating system 323, application program 325 such as a web browser application, a widget or gadget engine or another application, and data file 327. Storage medium 321 may store, for use by UE 300, any of a variety of various operating systems or combinations of operating systems.

Storage medium 321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 321 may allow UE 300 to access computer-executable instructions, application programs or the like, stored on transitory or non-transitory memory media, to off-load data, or to upload data. An article of manufacture, such as one utilizing a communication system may be tangibly embodied in storage medium 321, which may comprise a device readable medium.

In FIG. 3, processing circuitry 301 may be configured to communicate with network 343b using communication subsystem 331. Network 343a and network 343b may be the same network or networks or different network or networks. Communication subsystem 331 may be configured to include one or more transceivers used to communicate with network 343b. For example, communication subsystem 331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 333 and/or receiver 335 to implement transmitter or receiver functionality, respectively, appropriate to the RAN links (e.g., frequency allocations and the like). Further, transmitter 333 and receiver 335 of each transceiver may share circuit components, software or firmware, or alternatively may be implemented separately.

In the illustrated embodiment, the communication functions of communication subsystem 331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 331 may include cellular communication, Wi-Fi communication, Bluetooth communication, and GPS communication. Network 343b may encompass wired and/or wireless networks such as a local-area network (LAN), a wide-area network (WAN), a computer network, a wireless network, a telecommunications network, another like network or any combination thereof. For example, network 343b may be a cellular network, a Wi-Fi network, and/or a near-field network. Power source 313 may be configured to provide alternating current (AC) or direct current (DC) power to components of UE 300.

The features, benefits and/or functions described herein may be implemented in one of the components of UE 300 or partitioned across multiple components of UE 300. Further, the features, benefits, and/or functions described herein may be implemented in any combination of hardware, software or firmware. In one example, communication subsystem 331 may be configured to include any of the components described herein. Further, processing circuitry 301 may be configured to communicate with any of such components over bus 302. In another example, any of such components may be represented by program instructions stored in memory that when executed by processing circuitry 301 perform the corresponding functions described herein. In another example, the functionality of any of such components may be partitioned between processing circuitry 301 and communication subsystem 331. In another example, the non-computationally intensive functions of any of such components may be implemented in software or firmware and the computationally intensive functions may be implemented in hardware.

Figure 4:
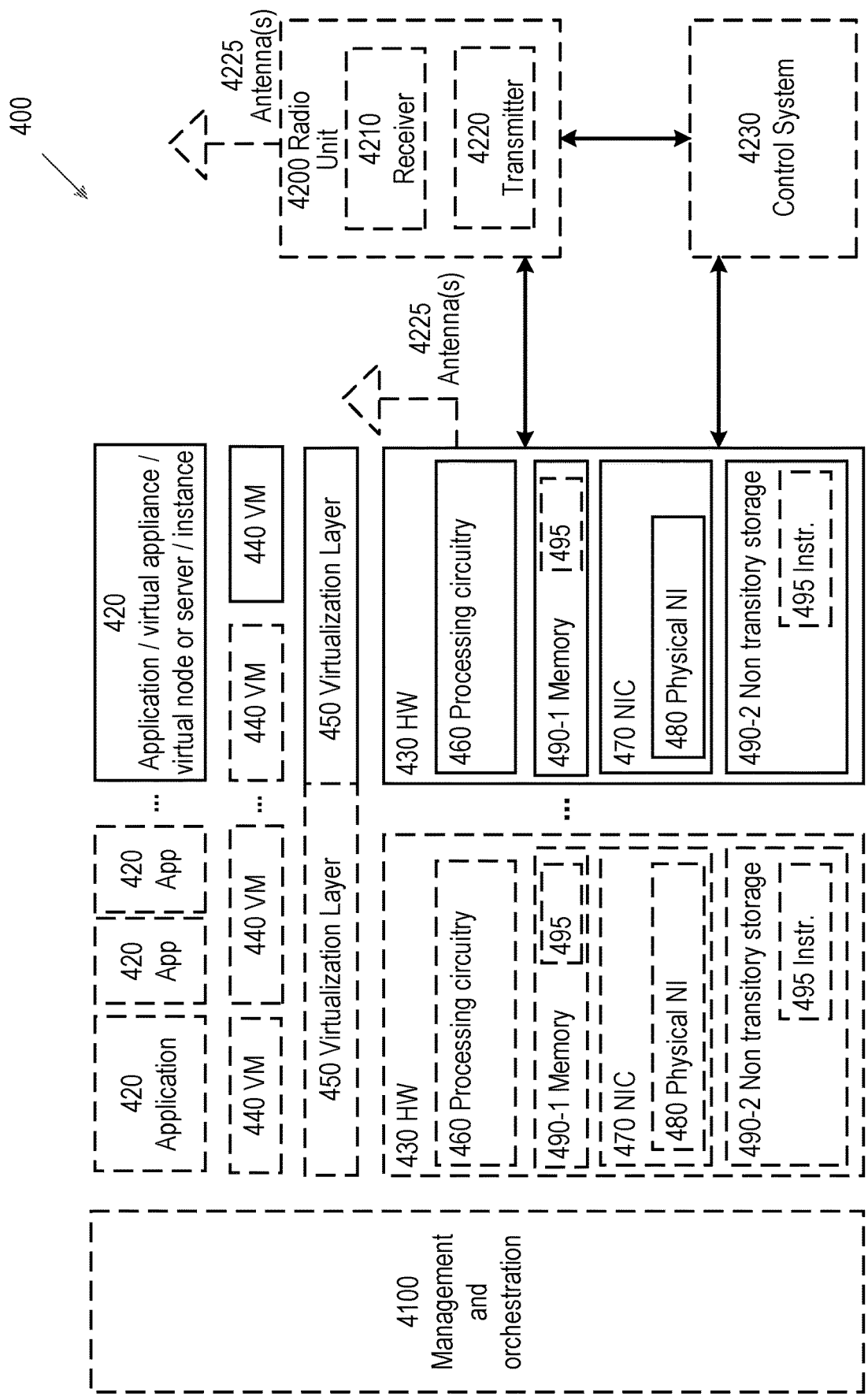
FIG. 4 illustrates a virtualization environment in accordance with some embodiments.

FIG. 4 illustrates a virtualization environment in accordance with some embodiments.

FIG. 4 is a schematic block diagram illustrating a virtualization environment 400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 400 hosted by one or more of hardware nodes 430. Further, in embodiments in which the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement some of the features, functions, and/or benefits of some of the embodiments disclosed herein. Applications 420 are run in virtualization environment 400 which provides hardware 430 comprising processing circuitry 460 and memory 490. Memory 490 contains instructions 495 executable by processing circuitry 460 whereby application 420 is operative to provide one or more of the features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by processing circuitry 460. Each hardware device may comprise one or more network interface controllers (NICs) 470, also known as network interface cards, which include physical network interface 480. Each hardware device may also include non-transitory, persistent, machine-readable storage media 490-2 having stored therein software 495 and/or instructions executable by processing circuitry 460. Software 495 may include any type of software including software for instantiating one or more virtualization layers 450 (also referred to as hypervisors), software to execute virtual machines 440 as well as software allowing it to execute functions, features and/or benefits described in relation with some embodiments described herein.

Virtual machines 440, comprise virtual processing, virtual memory, virtual networking or interface and virtual storage, and may be run by a corresponding virtualization layer 450 or hypervisor. Different embodiments of the instance of virtual appliance 420 may be implemented on one or more of virtual machines 440, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440.

As shown in FIG. 4, hardware 430 may be a standalone network node with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 440 may be a software implementation of a physical machine that runs programs as if they were executing on a physical, non-virtualized machine. Each of virtual machines 440, and that part of hardware 430 that executes that virtual machine, be it hardware dedicated to that virtual machine and/or hardware shared by that virtual machine with others of the virtual machines 440, forms a separate virtual network elements (VNE).

Still in the context of NFV, Virtual Network Function (VNF) is responsible for handling specific network functions that run in one or more virtual machines 440 on top of hardware networking infrastructure 430 and corresponds to application 420 in FIG. 4.

In some embodiments, one or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

In some embodiments, some signalling can be affected with the use of control system 4230 which may alternatively be used for communication between the hardware nodes 430 and radio units 4200.

Figure 5:
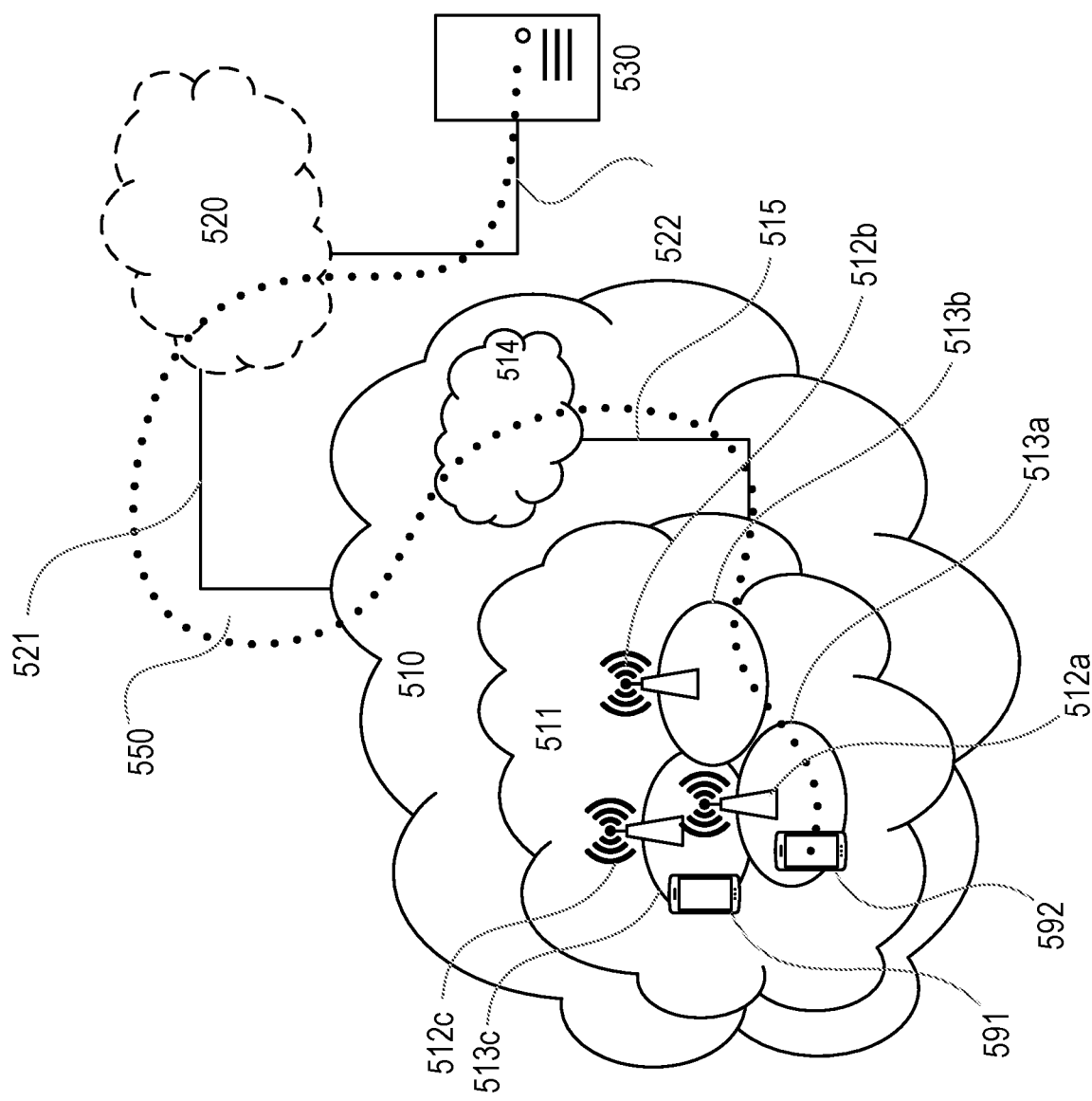
FIG. 5 illustrates a telecommunication network connected via an intermediate network to a host computer in accordance with some embodiments.

FIG. 5 illustrates a telecommunication network connected via an intermediate network to a host computer in accordance with some embodiments.

With reference to FIG. 5, in accordance with an embodiment, a communication system includes telecommunication network 510, such as a 3GPP-type cellular network, which comprises access network 511, such as a radio access network, and core network 514. Access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to core network 514 over a wired or wireless connection 515. A first UE 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

Telecommunication network 510 is itself connected to host computer 530, which may be embodied in the hardware and/or software of a standalone server, a cloud-implemented server, a distributed server or as processing resources in a server farm. Host computer 530 may be under the ownership or control of a service provider, or may be operated by the service provider or on behalf of the service provider. Connections 521 and 522 between telecommunication network 510 and host computer 530 may extend directly from core network 514 to host computer 530 or may go via an optional intermediate network 520. Intermediate network 520 may be one of, or a combination of more than one of, a public, private or hosted network; intermediate network 520, if any, may be a backbone network or the Internet; in particular, intermediate network 520 may comprise two or more sub-networks (not shown).

The communication system of FIG. 5 as a whole enables connectivity between the connected UEs 591, 592 and host computer 530. The connectivity may be described as an over-the-top (OTT) connection 550. Host computer 530 and the connected UEs 591, 592 are configured to communicate data and/or signaling via OTT connection 550, using access network 511, core network 514, any intermediate network 520 and possible further infrastructure (not shown) as intermediaries. OTT connection 550 may be transparent in the sense that the participating communication devices through which OTT connection 550 passes are unaware of routing of uplink and downlink communications. For example, base station 512 may not or need not be informed about the past routing of an incoming downlink communication with data originating from host computer 530 to be forwarded (e.g., handed over) to a connected UE 591. Similarly, base station 512 need not be aware of the future routing of an outgoing uplink communication originating from the UE 591 towards the host computer 530.

Figure 6:
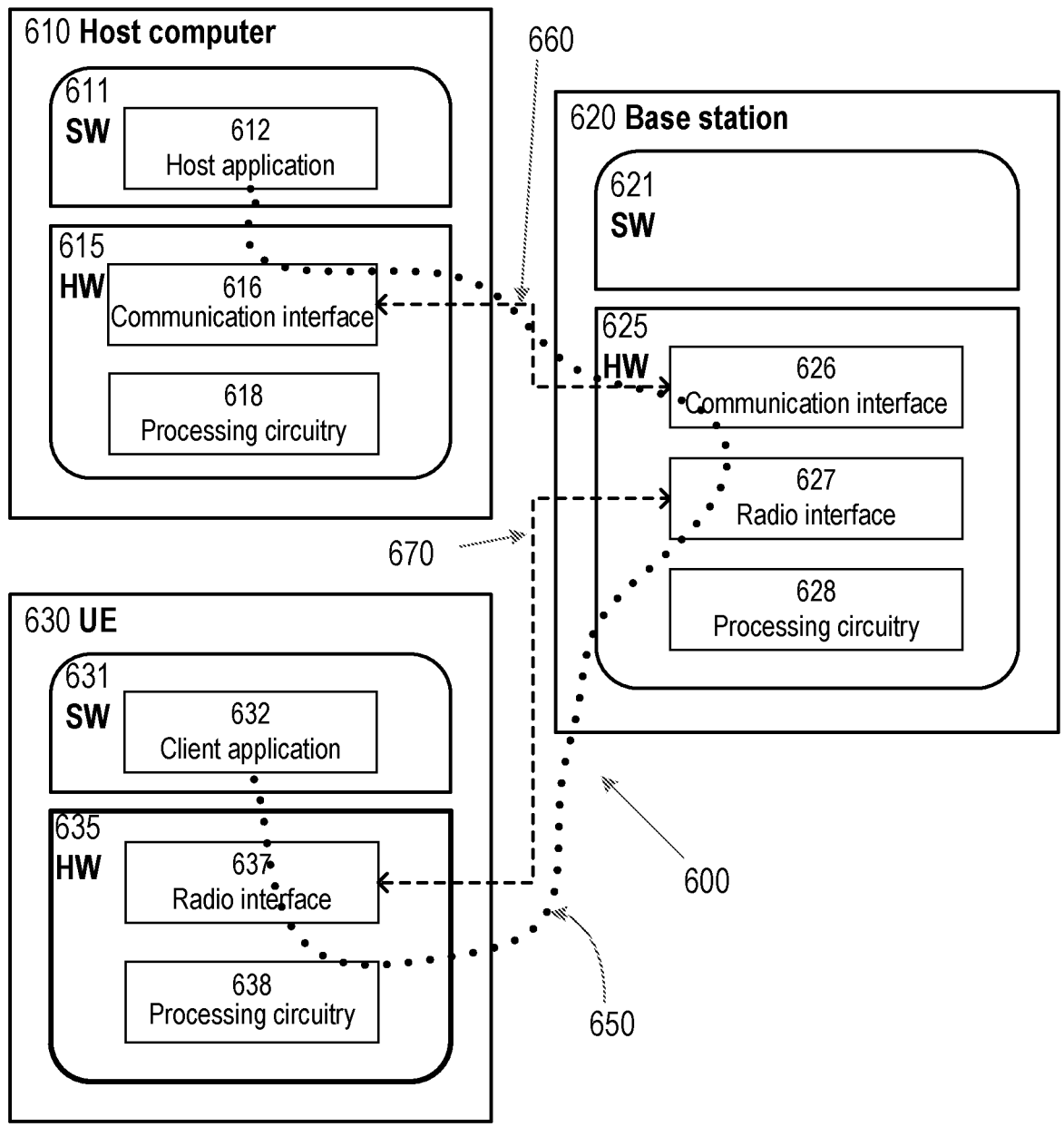
FIG. 6 illustrates a host computer communicating via a base station with a user equipment over a partially wireless connection in accordance with some embodiments.

FIG. 6 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 6. In communication system 600, host computer 610 comprises hardware 615 including communication interface 616 configured to set up and maintain a wired or wireless connection with an interface of a different communication device of communication system 600. Host computer 610 further comprises processing circuitry 618, which may have storage and/or processing capabilities. In particular, processing circuitry 618 may comprise one or more programmable processors, application-specific integrated circuits, field programmable gate arrays or combinations of these (not shown) adapted to execute instructions. Host computer 610 further comprises software 611, which is stored in or accessible by host computer 610 and executable by processing circuitry 618. Software 611 includes host application 612. Host application 612 may be operable to provide a service to a remote user, such as UE 630 connecting via OTT connection 650 terminating at UE 630 and host computer 610. In providing the service to the remote user, host application 612 may provide user data which is transmitted using OTT connection 650.

Communication system 600 further includes base station 620 provided in a telecommunication system and comprising hardware 625 enabling it to communicate with host computer 610 and with UE 630. Hardware 625 may include communication interface 626 for setting up and maintaining a wired or wireless connection with an interface of a different communication device of communication system 600, as well as radio interface 627 for setting up and maintaining at least wireless connection 670 with UE 630 located in a coverage area (not shown in FIG. 6) served by base station 620. Communication interface 626 may be configured to facilitate connection 660 to host computer 610. Connection 660 may be direct or it may pass through a core network (not shown in FIG. 6) of the telecommunication system and/or through one or more intermediate networks outside the telecommunication system. In the embodiment shown, hardware 625 of base station 620 further includes processing circuitry 628, which may comprise one or more programmable processors, application-specific integrated circuits, field programmable gate arrays or combinations of these (not shown) adapted to execute instructions. Base station 620 further has software 621 stored internally or accessible via an external connection.

Communication system 600 further includes UE 630 already referred to. Its hardware 635 may include radio interface 637 configured to set up and maintain wireless connection 670 with a base station serving a coverage area in which UE 630 is currently located. Hardware 635 of UE 630 further includes processing circuitry 638, which may comprise one or more programmable processors, application-specific integrated circuits, field programmable gate arrays or combinations of these (not shown) adapted to execute instructions. UE 630 further comprises software 631, which is stored in or accessible by UE 630 and executable by processing circuitry 638. Software 631 includes client application 632. Client application 632 may be operable to provide a service to a human or non-human user via UE 630, with the support of host computer 610. In host computer 610, an executing host application 612 may communicate with the executing client application 632 via OTT connection 650 terminating at UE 630 and host computer 610. In providing the service to the user, client application 632 may receive request data from host application 612 and provide user data in response to the request data. OTT connection 650 may transfer both the request data and the user data. Client application 632 may interact with the user to generate the user data that it provides.

It is noted that host computer 610, base station 620 and UE 630 illustrated in FIG. 6 may be similar or identical to host computer 530, one of base stations 512a, 512b, 512c and one of UEs 591, 592 of FIG. 5, respectively. This is to say, the inner workings of these entities may be as shown in FIG. 6 and independently, the surrounding network topology may be that of FIG. 5.

In FIG. 6, OTT connection 650 has been drawn abstractly to illustrate the communication between host computer 610 and UE 630 via base station 620, without explicit reference to any intermediary devices and the precise routing of messages via these devices. Network infrastructure may determine the routing, which it may be configured to hide from UE 630 or from the service provider operating host computer 610, or both. While OTT connection 650 is active, the network infrastructure may further take decisions by which it dynamically changes the routing (e.g., on the basis of load balancing consideration or reconfiguration of the network).

Wireless connection 670 between UE 630 and base station 620 is in accordance with the teachings of the embodiments described throughout this disclosure. One or more of the various embodiments improve the performance of OTT services provided to UE 630 using OTT connection 650, in which wireless connection 670 forms the last segment. More precisely, the teachings of these embodiments may improve the power consumption of connectivity of a wireless device and thereby provide benefits such as better responsiveness, whilst maintaining extended batter lifetime.

A measurement procedure may be provided for the purpose of monitoring data rate, latency and other factors on which the one or more embodiments improve. There may further be an optional network functionality for reconfiguring OTT connection 650 between host computer 610 and UE 630, in response to variations in the measurement results. The measurement procedure and/or the network functionality for reconfiguring OTT connection 650 may be implemented in software 611 and hardware 615 of host computer 610 or in software 631 and hardware 635 of UE 630, or both. In embodiments, sensors (not shown) may be deployed in or in association with communication devices through which OTT connection 650 passes; the sensors may participate in the measurement procedure by supplying values of the monitored quantities exemplified above, or supplying values of other physical quantities from which software 611, 631 may compute or estimate the monitored quantities. The reconfiguring of OTT connection 650 may include message format, retransmission settings, preferred routing etc.; the reconfiguring need not affect base station 620, and it may be unknown or imperceptible to base station 620. Such procedures and functionalities may be known and practiced in the art. In certain embodiments, measurements may involve proprietary UE signaling facilitating host computer 610's measurements of throughput, propagation times, latency and the like. The measurements may be implemented in that software 611 and 631 causes messages to be transmitted, in particular empty or 'dummy' messages, using OTT connection 650 while it monitors propagation times, errors etc.

Figure 7:
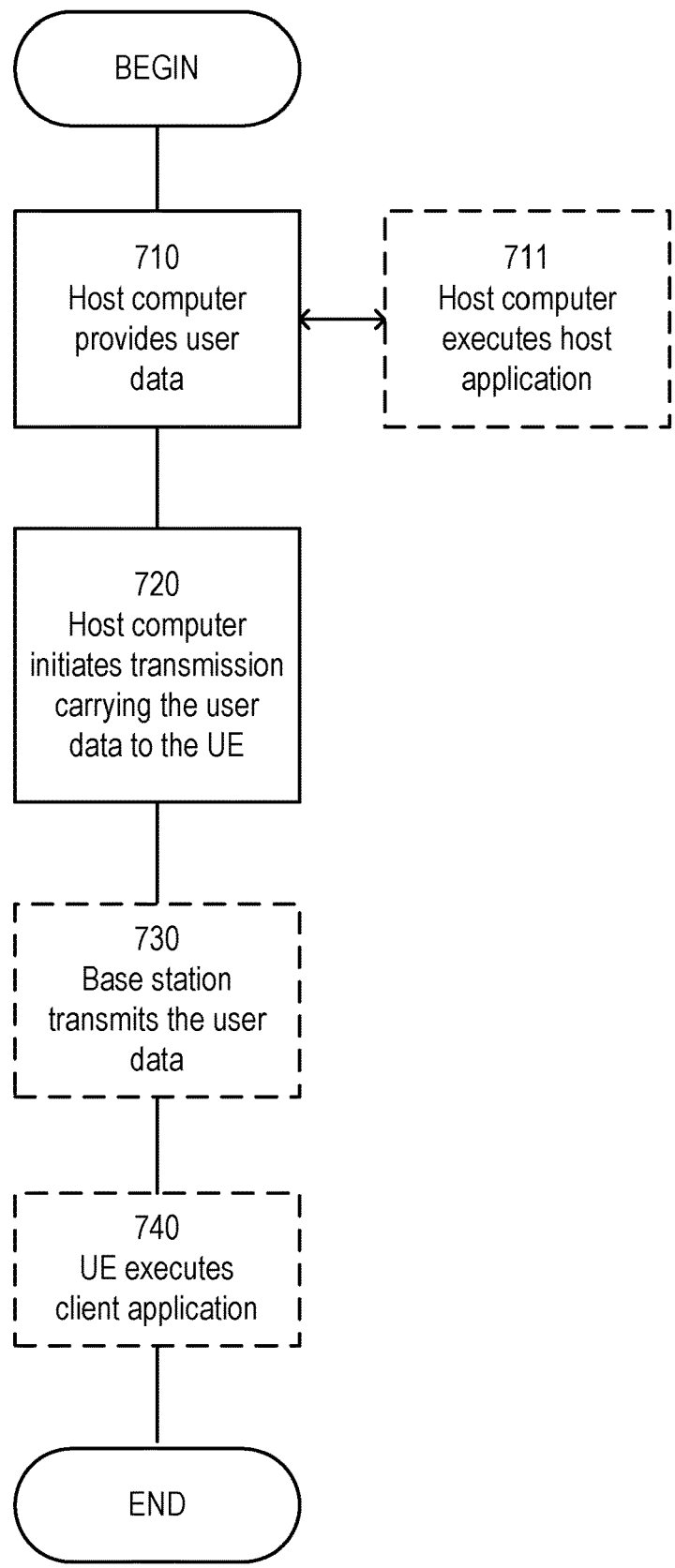
FIG. 7 illustrates methods implemented in a communication system including a host computer, a base station and a user equipment in accordance with some embodiments.

FIG. 7 illustrates methods implemented in a communication system including a host computer, a base station and a user equipment in accordance with some embodiments.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In step 710, the host computer provides user data. In substep 711 (which may be optional) of step 710, the host computer provides the user data by executing a host application. In step 720, the host computer initiates a transmission carrying the user data to the UE. In step 730 (which may be optional), the base station transmits to the UE the user data which was carried in the transmission that the host computer initiated, in accordance with the teachings of the embodiments described throughout this disclosure. In step 740 (which may also be optional), the UE executes a client application associated with the host application executed by the host computer.

Figure 8:
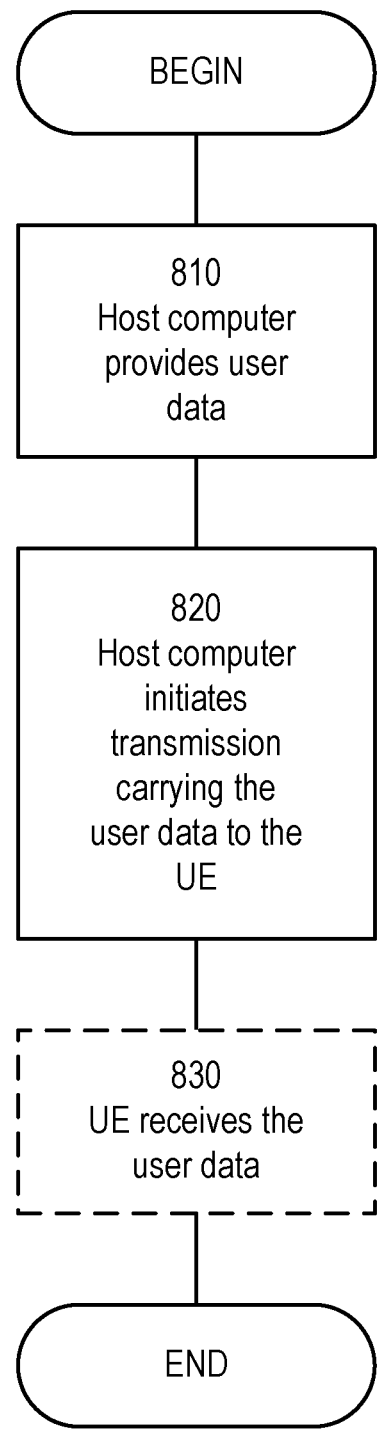
FIG. 8 illustrates methods implemented in a communication system including a host computer, a base station and a user equipment in accordance with some embodiments.

FIG. 8 illustrates methods implemented in a communication system including a host computer, a base station and a user equipment in accordance with some embodiments.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In step 810 of the method, the host computer provides user data. In an optional substep (not shown) the host computer provides the user data by executing a host application. In step 820, the host computer initiates a transmission carrying the user data to the UE. The transmission may pass via the base station, in accordance with the teachings of the embodiments described throughout this disclosure. In step 830 (which may be optional), the UE receives the user data carried in the transmission.

Figure 9:
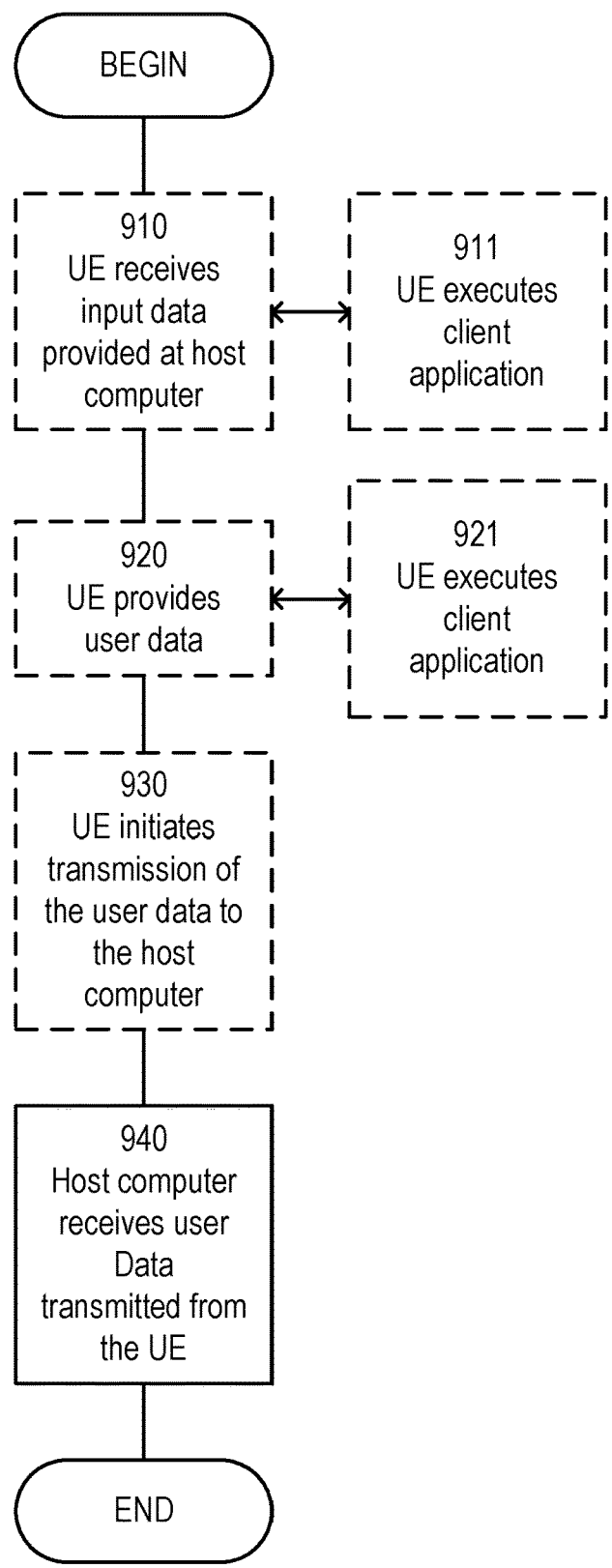
FIG. 9 illustrates methods implemented in a communication system including a host computer, a base station and a user equipment in accordance with some embodiments.

FIG. 9 illustrates methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In step 910 (which may be optional), the UE receives input data provided by the host computer. Additionally or alternatively, in step 920, the UE provides user data. In substep 921 (which may be optional) of step 920, the UE provides the user data by executing a client application. In substep 911 (which may be optional) of step 910, the UE executes a client application which provides the user data in reaction to the received input data provided by the host computer. In providing the user data, the executed client application may further consider user input received from the user. Regardless of the specific manner in which the user data was provided, the UE initiates, in substep 930 (which may be optional), transmission of the user data to the host computer. In step 940 of the method, the host computer receives the user data transmitted from the UE, in accordance with the teachings of the embodiments described throughout this disclosure.

Figure 10:
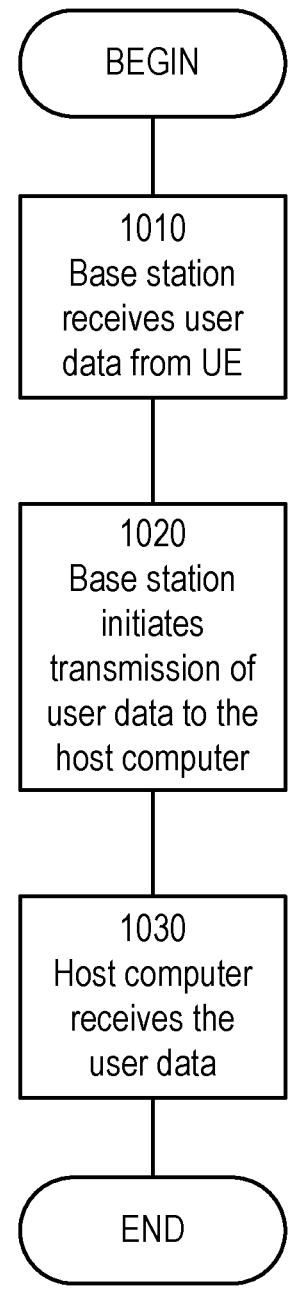
FIG. 10 illustrates methods implemented in a communication system including a host computer, a base station and a user equipment in accordance with some embodiments.

FIG. 10 illustrates methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In step 1010 (which may be optional), in accordance with the teachings of the embodiments described throughout this disclosure, the base station receives user data from the UE. In step 1020 (which may be optional), the base station initiates transmission of the received user data to the host computer. In step 1030 (which may be optional), the host computer receives the user data carried in the transmission initiated by the base station.

Figure 11:
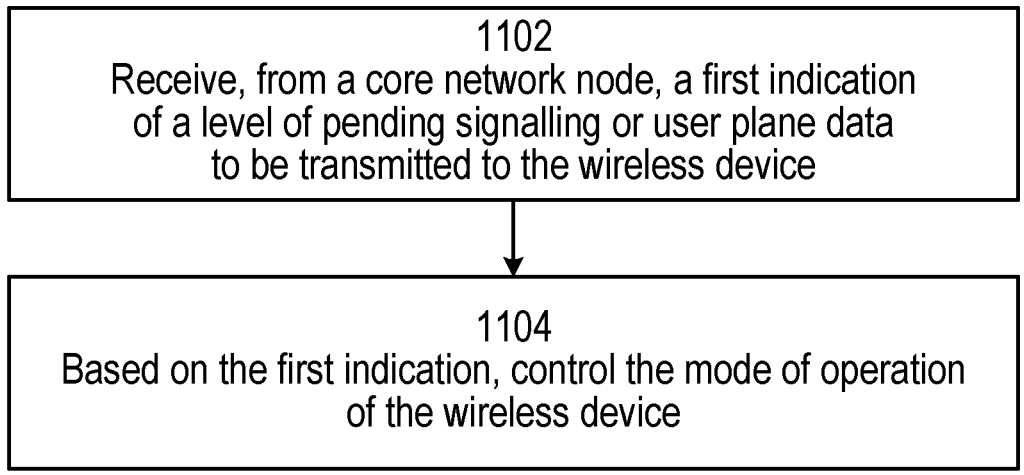
FIG. 11 illustrates a method in accordance with some embodiments.

FIG. 11 illustrates a method in accordance with some embodiments.

FIG. 11 depicts a method, in a base station, in accordance with particular embodiments, the method begins at step 1102 with receiving, from a core network node, a first indication of a level of pending signalling or user plane data to be transmitted to the wireless device. In step 1104 the method comprises based on the first indication, controlling the mode of operation of the wireless device.

Figure 12:
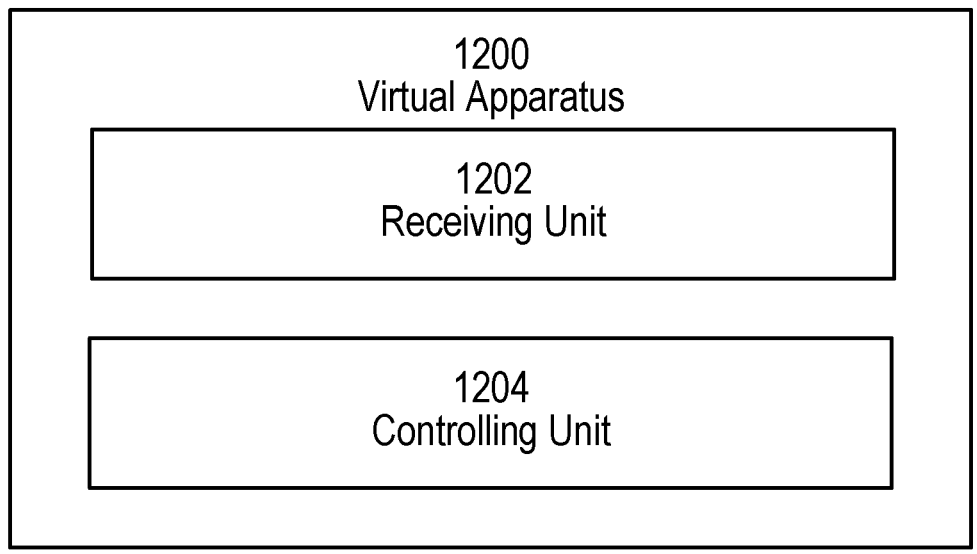
FIG. 12 illustrates a virtualization apparatus in accordance with some embodiments.

FIG. 12 illustrates a virtualization apparatus in accordance with some embodiments.

FIG. 12 illustrates a schematic block diagram of an apparatus 1200 in a wireless network (for example, the wireless network shown in FIG. 2). The apparatus may be implemented in a wireless device or network node (e.g., wireless device 210 or network node 260 shown in FIG. 2). Apparatus 1200 is operable to carry out the example method described with reference to FIG. 11 and possibly any other processes or methods disclosed herein. It is also to be understood that the method of FIG. 11 is not necessarily carried out solely by apparatus 1200. At least some operations of the method can be performed by one or more other entities.

Virtual Apparatus 1200 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 1202 and Controlling unit 1204, and any other suitable units of apparatus 1200 to perform corresponding functions according one or more embodiments of the present disclosure.

As illustrated in FIG. 12, apparatus 1200 includes Receiving unit 1202 and Controlling unit 1204. Receiving unit 1202 is configured to receive, from a core network node, a first indication of a level of pending signalling or user plane data to be transmitted to the wireless device. Controlling unit 1204 is configured to: based on the first indication, controlling the mode of operation of the wireless device.

FIG. 13 illustrates a method in accordance with some embodiments.

FIG. 13 depicts a method, in a core network node (e.g. an MME), in accordance with particular embodiments, the method begins at step 1302 with transmitting, from a core network node, a first indication of a level of pending signalling or user plane data to be transmitted to the wireless device.

FIG. 14 illustrates a virtualization apparatus in accordance with some embodiments.

FIG. 14 illustrates a schematic block diagram of an apparatus 1400 in a wireless network (for example, the wireless network shown in FIG. 2). The apparatus may be implemented in a wireless device or network node, e.g. a core network node. Apparatus 1400 is operable to carry out the example method described with reference to FIG. 13 and possibly any other processes or methods disclosed herein. It is also to be understood that the method of FIG. 13 is not necessarily carried out solely by apparatus 1400. At least some operations of the method can be performed by one or more other entities.

Virtual Apparatus 1400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause Receiving unit 1202 and Controlling unit WW04, and any other suitable units of apparatus 1200 to perform corresponding functions according one or more embodiments of the present disclosure.

As illustrated in FIG. 14, apparatus 1400 includes Transmitting unit 1402. Transmitting unit 1402 is configured to transmit, from a core network node, a first indication of a level of pending signalling or user plane data to be transmitted to the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Group B Embodiments

1. A method, in a base station, for controlling a mode of operation of a wireless device, the method comprising:
    receiving, from a core network node, a first indication of a level of pending signalling or user plane data to be transmitted to the wireless device; and
    based on the first indication, controlling the mode of operation of the wireless device.

2. The method as in embodiment 1 further comprising:
    receiving, from the wireless device, a second indication relating to a level of pending signalling or user plane data expected to be received or transmitted by the wireless device; and
    controlling the mode of operation of the wireless device further based on the second indication.

3. The method as in embodiment 2 further comprising responsive to the first indication indicating that there is no pending signalling or user plane data to be transmitted to the wireless device, and the second indication indicating that there is no pending signalling or user plane data expected to be received or transmitted the wireless device, releasing wireless device from a connected mode of operation into a lower power of operation.

4. The method as in embodiment 2 or 3 further comprising responsive to the first indication indicating that there is pending signalling or user plane data to be transmitted to the wireless device from the core network, and the second indication indicating that there is no pending signalling or user plane data expected to be received or transmitted by the wireless device, setting the mode of operation of the wireless device as a connected mode of operation.

5. The method as in embodiment 4 further comprising responsive to the first indication indicating that there is pending signalling or user plane data to be transmitted to the wireless device from the core network, and the second indication indicating that there is no pending signalling or user plane data expected to be received or transmitted by the wireless device, maintaining the wireless device in the connected mode of operation until the pending signalling or user plane data has been transmitted to the wireless device.

6. The method as in embodiment 5 further comprising responsive to the pending signalling or user plane data being transmitted to the wireless device, setting the mode of operation of the wireless device to a lower power mode of operation.

7. The method as in embodiment 2 to 6 wherein the connected mode of operation comprises Radio Resource Control, RRC, Connected.

8. The method as in any preceding embodiment wherein the first indication is received as an information element in a User Equipment, UE, Information Transfer.

9. The method as in any preceding embodiment wherein the first indication is received from a Mobile Mobility Entity, MME.

10. The method of any of the previous embodiments, further comprising:
    obtaining user data; and
    forwarding the user data to a host computer or a wireless device.

Group C Embodiments

11. A method, in a core network node, for controlling a mode of operation of a wireless device, the method comprising:
    transmitting, from a core network node, a first indication of a level of pending signalling or user plane data to be transmitted to the wireless device.

12. The method as in embodiment 10 wherein the first indication is transmitted as an information element in a User Equipment, UE, Information Transfer.

13. The method as in embodiment 10 or 11 wherein the first indication is received from a Mobile Mobility Entity, MME.

Group D Embodiments

14. A base station for controlling a mode of operation of a wireless device, the base station comprising:
    processing circuitry configured to perform any of the steps of any of the Group B embodiments;
    power supply circuitry configured to supply power to the base station.

15. A communication system including a host computer comprising:
    processing circuitry configured to provide user data; and
    a communication interface configured to forward the user data to a cellular network for transmission to a user equipment (UE),
    wherein the cellular network comprises a base station having a radio interface and processing circuitry, the base station's processing circuitry configured to perform any of the steps of any of the Group B embodiments.

16. The communication system of the previous embodiment further including the base station.

17. The communication system of the previous 2 embodiments, further including the UE, wherein the UE is configured to communicate with the base station.

18. The communication system of the previous 3 embodiments, wherein:
    the processing circuitry of the host computer is configured to execute a host application, thereby providing the user data; and
    the UE comprises processing circuitry configured to execute a client application associated with the host application.

19. A method implemented in a communication system including a host computer, a base station and a user equipment (UE), the method comprising:
    at the host computer, providing user data; and
    at the host computer, initiating a transmission carrying the user data to the UE via a cellular network comprising the base station, wherein the base station performs any of the steps of any of the Group B embodiments.

20. The method of the previous embodiment, further comprising, at the base station, transmitting the user data.

21. The method of the previous 2 embodiments, wherein the user data is provided at the host computer by executing a host application, the method further comprising, at the UE, executing a client application associated with the host application.

22. A user equipment (UE) configured to communicate with a base station, the UE comprising a radio interface and processing circuitry configured to performs the of the previous 3 embodiments.

23. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

24. The communication system of the previous embodiment further including the base station.

25. The communication system of the previous 2 embodiments, further including the UE, wherein the UE is configured to communicate with the base station.

26. The communication system of the previous 3 embodiments, wherein:
    the processing circuitry of the host computer is configured to execute a host application;
    the UE is configured to execute a client application associated with the host application, thereby providing the user data to be received by the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

Abbreviation Explanation

AI Artificial Intelligence
AS Access Stratum
CIoT Cellular Internet of Things
CN Core Network
CP Control Plane
DRX Discontinuous Reception
EDT Early Data Transmission
IE Information Element
ML Machine Learning
MT Mobile Terminated
RAI Release Assistance Indicator
RRC Radio Resource Control
UP User Plane1×RTT CDMA2000 1× Radio Transmission Technology
3GPP 3rd Generation Partnership Project 5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDUCommon Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SM LC Evolved-Serving Mobile Location Centre
ECGI Evolved CGI
eNB E-UTRAN NodeB
ePDCCH enhanced Physical Downlink Control Channel
E-SM LC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a base station of a wireless communication network, with respect to a wireless device in a RRC_CONNECTED mode, the method comprising:
receiving, from a node in a core network of the wireless communication network, a first indication indicating whether there is pending user plane data in the core network to be transmitted to the wireless device;

receiving, from the wireless device, a second indication indicating whether there is user plane data expected to be received or transmitted by the wireless device; and responsive to the first indication indicating that there is pending user plane data in the core network to be transmitted to the wireless device, maintaining the wireless device in the RRC_CONNECTED mode for transmission of the pending user plane data, even if the second indication indicates that the wireless device does not expect to receive or transmit user plane data.

2. The method as in claim 1 further comprising responsive to the first indication indicating that there is no user plane data to be transmitted to the wireless device, and the second indication indicating that there is no user plane data expected to be received or transmitted the wireless device, releasing the wireless device from the RRC_CONNECTED mode into a lower power of operation.

3. The method as in claim 1 further comprising responsive to the user plane data being transmitted to the wireless device, setting a mode of operation of the wireless device to a lower power mode of operation.

4. The method as in claim 1 wherein the first indication is received as an information element in a User Equipment (UE) Information Transfer.

5. The method as in claim 1 wherein the first indication is received from a Mobile Mobility Entity (MME).

6. A base station of a wireless communication network, for controlling a wireless device in a RRC_CONNECTED mode, the base station comprising processing circuitry configured to:

receive, from a node in a core network of the wireless communication network, a first indication indicating whether there is pending user plane data in the core network to be transmitted to the wireless device;

receive, from the wireless device, a second indication indicating whether there is user plane data expected to be received or transmitted by the wireless device; and responsive to the first indication indicating that there is pending user plane data in the core network to be transmitted to the wireless device, maintain the wireless device in the RRC_CONNECTED mode for transmission of the pending user plane data, even if the second indication indicates that the wireless device does not expect to receive or transmit user plane data.

7. The base station as in claim 6 wherein the processing circuitry is further configured to responsive to the first indication indicating that there is no user plane data to be transmitted to the wireless device, and the second indication indicating that there is no user plane data expected to be received or transmitted the wireless device, release wireless device from the RRC_CONNECTED mode of operation into a lower power of operation.

8. The base station as in claim 6 wherein the processing circuitry is further configured to responsive to the user plane data being transmitted to the wireless device, set the mode of operation of the wireless device to a lower power mode of operation.

9. The base station as in claim 6 wherein the first indication is received as an information element in a User Equipment (UE) Information Transfer.

10. The base station as in claim 6 wherein the first indication is received from a Mobile Mobility Entity, MME.

* * * * *